July 11, 1933.  F. D. PFENING ET AL  1,918,128
FLOAT CONTROLLED VALVE MECHANISM
Filed June 23, 1931  2 Sheets-Sheet 1
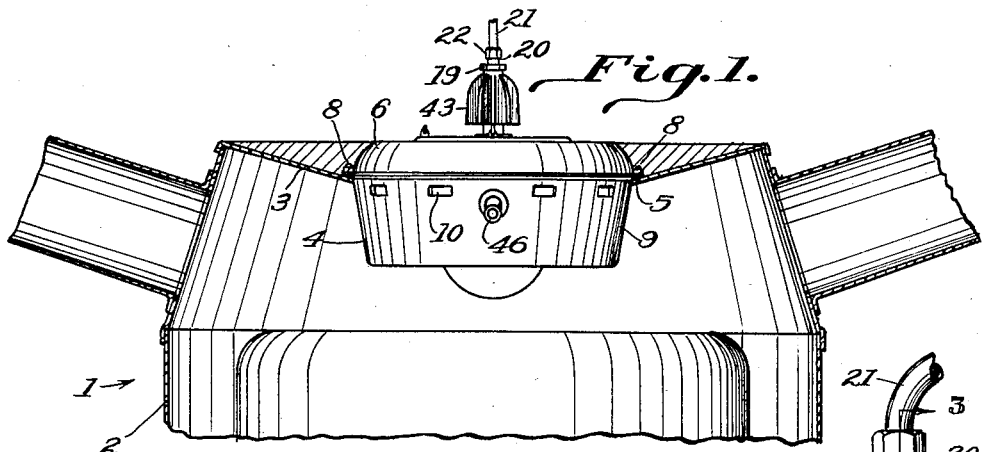
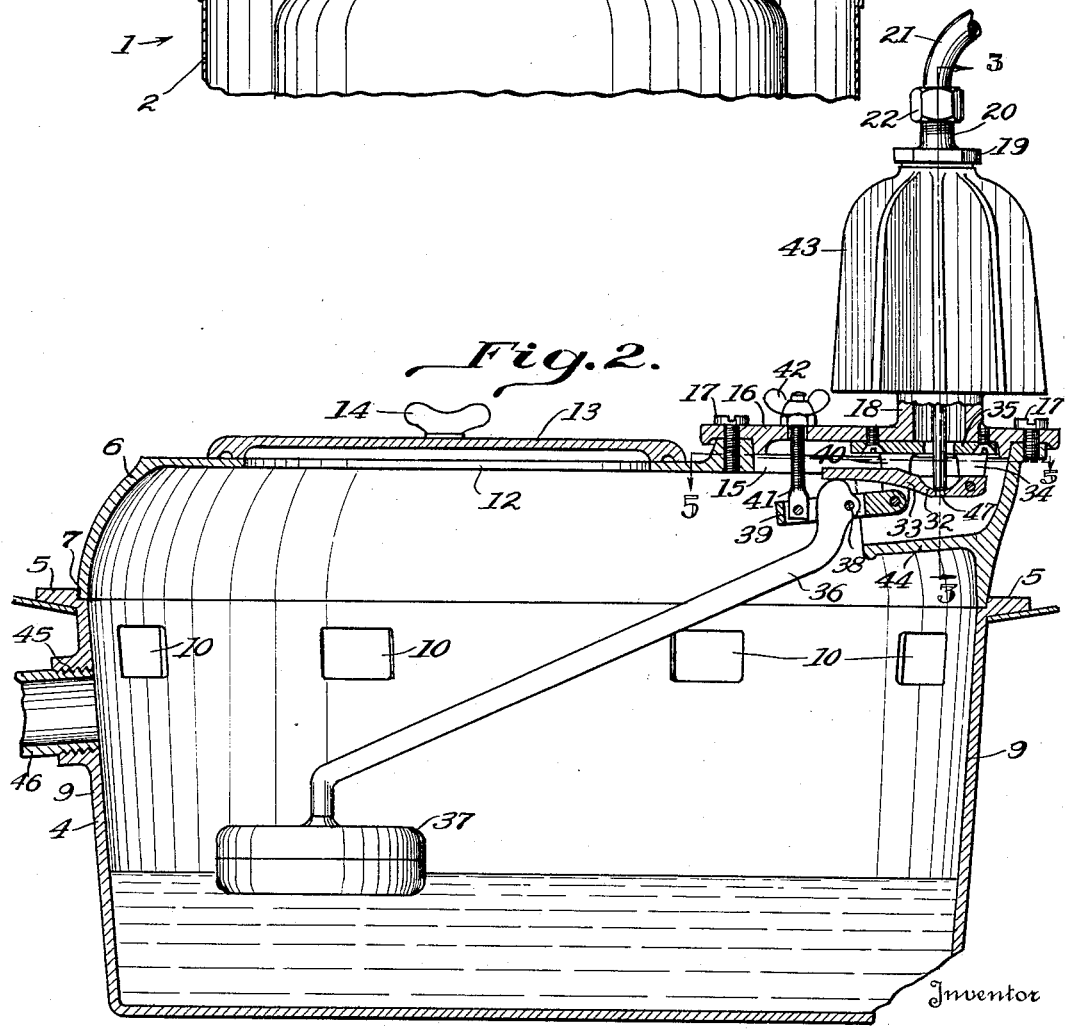
Inventor
F. D. Pfening
H. Pfening Jr.
By W. S. McDowell
Attorney July 11, 1933.    F. D. PFENING ET AL    1,918,128
FLOAT CONTROLLED VALVE MECHANISM
Filed June 23, 1931    2 Sheets-Sheet 2
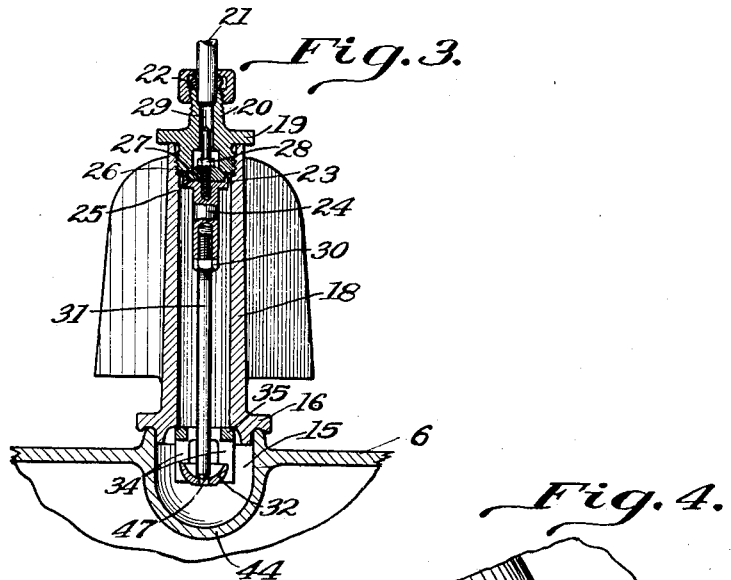
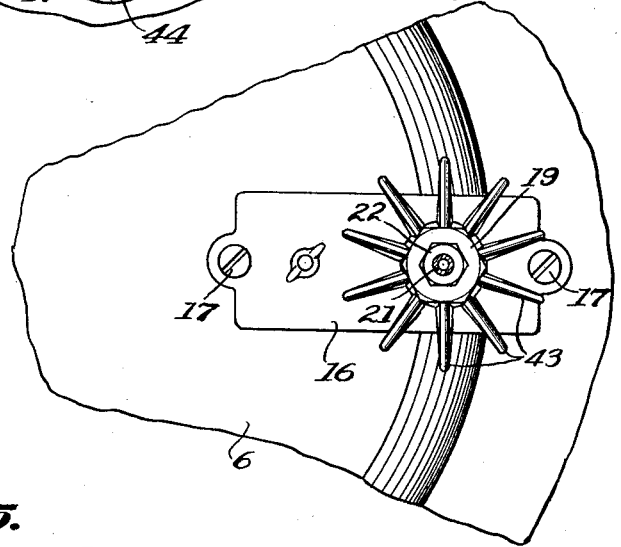
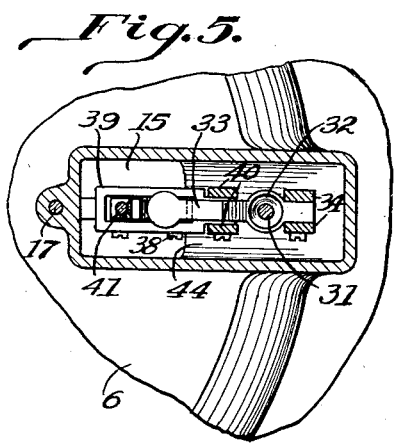
Inventor
F. D. Pfening
H. Pfening Jr.
By W. D. McDowell
Attorney Patented July 11, 1933

1,918,128

UNITED STATES PATENT OFFICE

FREDERIC D. PFENING AND HENRY PFENING, JR., OF COLUMBUS, OHIO, ASSIGNORS TO THE FRED D. PFENING COMPANY, OF COLUMBUS, OHIO, A CORPORATION OF OHIO

FLOAT CONTROLLED VALVE MECHANISM

Application filed June 23, 1931. Serial No. 546,350.

This invention relates to valve mechanisms and is directed more particularly to the float controlled type for regulating the inflow of liquids into an associated vessel or reservoir for the maintenance of a predetermined liquid level therein.

The primary object of the invention is to provide a valve mechanism of this character which is particularly adapted for use in connection with humidifiers or air moisteners for domestic heating plants and wherein the valve mechanism functions to automatically regulate the quantity of liquid within the humidifier in accordance with the operating demands of the heating plant.

Another object of the invention is to provide a lever mechanism between the valve for controlling the inlet flow of liquid into the reservoir of the humidifier and the float positioned therein which is so arranged as to effect the positive opening and closing of the valve at intervals governed by the rise and fall of the liquid level and maintain the valve in firm engagement with its seat when closed to prevent dripping or leaking of liquids which would tend to cause a damaged valve or seat.

A further object of the invention is to form the lever mechanism into a plurality of sections which are so pivoted relative to one another that an increased leverage is obtained by the float upon the valve and to thereby hold the latter in tight engagement against the seat with but a slight lifting effort on the part of the float member. Further, means are provided by which said lever mechanism may be adjusted to increase or decrease the lifting force of the float in accordance with the water pressures in the supply main in order to substantially maintain the same liquid level within the reservoir of the humidifier regardless of such pressures.

A still further object is to form the lever arrangement such that the means by which the valve may be opened quickly and closed relatively slow.

It is also an object of the invention to position the valve exterior of the heating plant and reservoir of the humidifier and to provide means in connection with said valve which will effect the cooling thereof in order that the same may be maintained at substantially atmospheric temperatures to keep the valve in a proper operating condition and not be affected by the accumulation of lime or other deposits which would be the case should the valve be exposed to superatmospheric temperatures and positioned within the reservoir and come in contact with the heated liquid therein.

With these and other objects in view, which will appear as the description proceeds, the invention consists in the novel features of construction, combinations of elements and arrangements of parts hereinafter to be more fully described and pointed out in the appended claims.

In the accompanying drawings:

Figure 1 is a vertical sectional view taken through the upper part of the heating plant showing the humidifier in place therein in which is employed the valve mechanism comprising the invention, Figure 2 is an enlarged vertical sectional view taken through the humidifier structure showing more in detail the float operated valve structure associated therewith, Figure 3 is a vertical sectional view taken on the line 3—3 of Figure 2, Figure 4 is a detail plan view of the valve housing forming a part of the valve structure, and Figure 5 is a horizontal sectional view taken on the line 5—5 of Figure 2.

Referring more particularly to the drawings, the numeral 1 designates a heating plant which, for the purpose of illustration only, has been shown as that of a warm air furnace of the domestic type, and may be of any well known construction but in this instance includes the usual outer sheet metal casing 2 terminating at its upper end into the depressed conical top wall 3. The top wall 3 is formed with a central opening in which is positioned reservoir 4 of the humidifier with which is associated the valve mechanism comprising the present invention.

The liquid reservoir 4 of the humidifier is preferably of circular formation and formed of cast iron or other suitable materials. The upper edge of the reservoir is provided with a lateral flange 5 which is adapted to rest upon the marginal edges of the openings formed in the top wall 3 of the heating plant. Closing the upper end of the reservoir is a cover 6 which has its lower end positioned upon the rabbeted edge 7 and secured to the flange 5 by means of screws or other fastening devices 8. The reservoir pan 4 has its cylindrical side wall 9 provided with a plurality of openings or ports 10 which are located near the upper edge of said wall and above the liquid level within the reservoir. The ports 10 serve to permit the escape of the generated vapor or steam derived from the water within the reservoir which vapor will flow with the hot air through the heating flues to the several rooms of the building.

The cover section 6 which is positioned exterior of the furnace or heating plant and above the wall 3 is provided with an opening 12 which is covered by a lid 13 held in place by a thumb screw or the like 14. Through the opening 12 access may be had to the interior of the reservoir for cleaning or inspection purposes. Also formed in the top wall or cover section and located to one side of the opening 12 is a second opening 15 covered by a plate 16 on which is mounted the valve mechanism for controlling the inlet flow of liquid to the reservoir and to which mechanism the present invention is particularly directed. The plate 16 is held rigid in place by screws 17 threadedly received within openings formed in the top wall or cover 6.

Extending upwardly from the plate 16 and integrally formed therewith is a cylindrical member 18 constituting the valve housing which is open at its lower end and has its upper end closed by means of a threaded valve seat plug 19. The upper portion of the plug 19 is reduced in diameter as at 20 and has connected thereto the lower end of a supply pipe 21 which is held in place by means of a clamping connection 22 of any well known construction common to this type of apparatus.

Positioned for vertical movement within the cylindrical member 18 is a valve assembly designated generally by the numeral 23. Said assembly is formed to include a body member 24 formed with a recess 25 at its upper end in which is positioned a valve washer 26 formed of rubber, composition or other material suitable for this purpose, said washer being tapered to conform to a similarly shaped seat 27 formed with the lower end of the valve seat plug 19. The washer is held in place by means of a threaded pin 28 screwed into the upper end of the body 24 and which pin also serves to guide the upper end of the valve assembly for vertical movement within the cylindrical member 18. The upper end of the pin 28 is of a diameter slightly less than the bore 29 formed in the plug member 19 so as to permit the water to pass through said bore when said valve is in an open position. Threadedly secured to the lower end of the body 24 and held in locked engagement therewith by a nut 30 is the upper end of a rod or stem 31 which has its lower end resting within a cone shaped cup 32 formed in a lever 33 carried by the plate 16, the lever 33 being pivotally connected between a pair of spaced depending lugs 34 formed with a saddle member 35 secured to the under surface of the valve structure carrying plate 16. Engaging with the outer end of the lever 33 is the cam shaped upper end of the float carrying arm 36 which has its lower end equipped with a float 37 and its upper end pivoted as at 38 to a yoke 39 mounted for pivotal movement at one end to a pair of lugs 40 also carried and depending from the under surface of the saddle member 35. The outer end of the yoke 39 is connected to a threaded stem 41 extending through the plate 16 and which has its upper threaded portion equipped with a wing nut 42 by which the stem may be adjusted in a vertical plane to raise or lower the outer end of the yoke 39, the purpose of which will appear later.

From the structure so far described it will be seen that as the float member moves in response to fluctuations of the liquid level, the cam at the upper end of said arm will engage with the under surface of the lever 33, said lever being raised or lowered and imparting a similar movement to the valve assembly 23. Due to this compound lever mechanism or multiplicity of lever sections and the provision of said cam, an extremely powerful lifting action on the part of said float member will be imparted to the valve with the result that the latter will be held in firm engagement with its seat to positively shut off any water flow through said valve. This multiplied lever action together with the shifting of the cam relative to the under surface of the lever 33 permits the float member 37 to move a certain distance with the liquid level before effecting the movement of the valve member. However, when the engaging point of the cam which, when the valve is closed is in a position approximately above the pivot of the cam, has moved so that the cam is a certain distance to one side of said pivot the valve will open quickly due to the pressure exerted on the valve member by the liquid and which pressure tends to cause the lever 33 to rock the cam in an outward direction therefrom. The return or closing movement of the valve has been found to be relatively slow which is perhaps due to the fact that the valve after being once opened is acted upon by the liquid pressure or the force of the liquid passing therethrough and this together with the position of the cam will hold the float back or retard the same in its upward movement until the float is sufficiently submerged that its lifting power will overcome the force exercised upon the valve and thereby move the latter to a closing position. These opposed forces will take up all lost motion between the levers and the pivots and tend to produce a line of strain upon the mechanism which becomes more pronounced as the cam is being moved in a direction towards its pivotal point or the vertical plane taken therethrough. This strain upon the mechanism will be maintained until the cam has again been moved by the float through an arc which will permit the release of the valve from its seat.

By the provision of the adjustable yoke 39 forming the pivotal mounting for the cam shaped upper end of the float arm, said lever and valve mechanism may be adjusted to suit varying water pressures existing in a liquid supply line and yet maintain substantially the same liquid level within the reservoir. Thus, with greater water pressures the outer end of the yoke is raised by means of the threaded member and wing nut 41 and 42 causing the float member to move downwardly, due to the action between the cam and the outer end of the lever, and submerge itself to a greater extent in the liquid and displacing a larger amount of the latter, thereby resulting in a greater lifting force on the part of the valve which will be imparted through the lever mechanism to the operating end of the valve member. It will therefore be seen that by means of this adjustment of the yoke, the float member may be submerged more or less according to existing pressures within the supply line and yet maintain the water level within the reservoir at substantially the same point. This adjustment of the float may be viewed through the lid covered opening 12 in the top of the cover 6 and the adjustment set when the proper liquid level has been reached, which liquid level will thus be automatically maintained by the action of said float.

An important feature of the invention is the cooling of the valve in order that the heat from the furnace or heating plant will not have a detrimental effect upon the rubber or composition material forming the valve washer, and to this end the cylindrical member or valve casing 18 is provided upon its exterior surface with spaced radiating fins 43 between which the atmospheric air surrounding the valve casing may engage so as to carry off excessive heat which would tend to break down the properties of the valve washer and cause the same to crack or become distorted with resultant leaks or drips which would tend to destroy the proper functioning of said valve. By the provision of the fins 43 the valve may be positioned in close proximity to the humidifier and yet be kept in a cool condition which is highly essential.

It is through that in view of the foregoing the operation of the humidifier will be readily understood, the flow of water into the reservoir being regulated by the valve so that the water will flow into the vaporizing reservoir only in such quantities as may be readily vaporized or converted into steam when the furnace is in use. Said water will flow past said valve downwardly through the valve casing 18 and through an opening formed in the upper part of the saddle member 35, over the lever 33 and onto a shelf 44 cast integrally with the cover 6. This shelf slopes inwardly and terminates at a point spaced from the side wall of the cover and the reservoir so that the water stream will flow directly into the reservoir without contacting with the walls thereof. This arrangement will eliminate any accumulation of lime or other deposits upon the inner surface of the reservoir wall and eliminate the tendency of the water seeping through the joint between the reservoir and the cover section. After a desired quantity of water has emptied in the reservoir 4 the float 39 will move upwardly in response to the rise in the liquid level and effect the operation of the cam at the upper end of the float arm 36, which cam in turn coacts with the lever 33 to move the valve upwardly within the valve casing 18 until the valve washer or gasket 26 engages the valve seat 27 thereby closing the inlet. If for any reason the valve should fail in its operation and remain open causing the liquid level within the reservoir to rise above the predetermined level, the side wall of the reservoir 4 is provided with a threaded opening 45 into which the end of an overflow pipe 46 is received, which pipe leads to a point exterior of the furnace body and may lead to a sewer or other point of exposure. The size of the pipe is sufficient to remove by gravity the full flow from the inlet supply pipe under pressure.

The reservoir may be readily serviced and the adjustment of the float member to regulate the liquid level in accordance with the water pressure in the line supplying the reservoir may be effected by the raising or lowering of the yoke 39 through the manipulation of the wing nut adjustment located above the cover. The valve and the lever mechanism may be removed for cleaning or repair purposes as a unit by simply unscrewing the fastening elements 17 as said mechanism is carried entirely by the plate 16. The valve assembly may be removed by itself by unthreading the valve seat plug 19 from engagement with the upper end of the valve casing 18 and the valve lifted therefrom as the lower end of the stem or rod 31 is not directly connected with the lever 33 but only rests within the cup 32 formed in said lever. The rod or stem 31, which is threaded within the lower end of the valve body 23, may also be adjusted to vary the effective length of said valve assembly relative to the valve seat and the lever 33. The cup in which the lower end of said rod is positioned may be formed with an opening 47 so that the water flowing through said valve may pass in part through said opening keeping the lower end of said stem clean and preventing any foreign matter within the water from collecting within the bottom of said cup and disturbing the adjustment of said valve.

From the foregoing it will be seen that a float control valve mechanism has been provided which is of novel construction and is particularly suitable for use in connection with humidifier structures associated with heating plants and wherein its is desired to maintain a predetermined quantity of liquid. The valve mechanism is of an exceedingly simple and practical construction and is so formed that the same may be readily adjusted to suit water pressures of various localities in which the humidifier is installed. The valve member by means of the radiating fins formed with the valve casing is kept in a cool condition at all times by the atmosphere surrounding the same, thus increasing the life of said valve and maintaining the same in proper working condition. The compound lever mechanism employed in connection with said valve and float member effects a positive opening and closing of the valve and due to the increased leverage of said lever mechanism, the valve may be held tightly in engagement with its seat and will not drip or leak but will stay shut until more water is needed in the evaporation chamber or reservoir. All the working parts of the valve mechanism, with the exception of the valve washer which is in direct contact with the water flowing through said valve and into the reservoir are made of bronze or other non-rusting material thereby insuring long life and minimizing the need of repairs. The reservoir of the humidifier structure also involves novel features and may be readily installed for operation within a warm air or vapor heating plant without the need of altering or disturbing any of the parts of the plant or interfering with the proper circulation of air therethrough.

The provision of the cooling fins on the valve housing also functions to minimize the formation of lime deposit in the passages and ports of the valve assembly, by maintaining the water at such low temperatures as to prevent material lime deposits.

Although we have shown and described what we consider to be the preferred form of the invention, nevertheless it will be understood that various slight changes may be made in the operating parts and the arrangement thereof without departing from the spirit and scope of the invention.

What is claimed is:

1. A float controlled valve structure for regulating the flow of liquid into a reservoir, comprising a movable valve member, a pivoted lever engaging said member, a pivoted and adjustable yoke, and a float carrying arm provided with a cam engaging the outer free end of said lever and pivoted to said yoke.

2. A float controlled valve structure for regulating the inflow of liquid into an associated reservoir, comprising a movable valve member, a lever engaging said member, a pivoted yoke, a float carrying arm having its upper end pivotally mounted to said yoke and engaging the outer end of said lever, and means situated exteriorly of said reservoir for varying the pivotal connection of said float carrying arm with respect to said lever.

3. A float controlled valve mechanism for regulating the inflow of liquid into an associated reservoir, comprising a valve casing secured to said reservoir and positioned exteriorly thereof, means for connecting said valve casing to a source of liquid supply, a valve within said casing having a stem extending into the upper part of said reservoir, a pivoted lever engaging the lower end of said stem, a pivoted yoke arranged below said lever, a float carrying arm formed with a cam at its upper end and pivotally connected to said yoke for engagement with said lever, and threaded adjusting means connecting said yoke and located exteriorly of said reservoir.

4. A humidifier of the character described comprising a reservoir, a valve casing mounted on said reservoir, a valve for controlling an inlet port positioned within said casing, a pivoted lever engaging the stem of said valve, a pivoted yoke, a float carrying arm having its upper end pivotally mounted to said yoke and engaging the outer end of said lever, and threaded means extending through an opening formed in the top wall of said reservoir for adjusting said yoke to vary the pivotal connection of said float carrying arm with respect to said lever.

In testimony whereof we affix our signatures.

FREDERIC D. PFENING.
HENRY PFENING, Jr.